Aug. 4, 1959

J. S. LINN 2,898,412

THREE PHASE POWER SUPPLY SYSTEM

Filed April 22, 1957

INVENTOR:
Jerome S. Linn

By Smyth & Roston
Attorneys

Aug. 4, 1959  J. S. LINN  2,898,412
THREE PHASE POWER SUPPLY SYSTEM
Filed April 22, 1957  4 Sheets-Sheet 3

INVENTOR:
Jerome S. Linn
Attorneys

Aug. 4, 1959

J. S. LINN 2,898,412

THREE PHASE POWER SUPPLY SYSTEM

Filed April 22, 1957

INVENTOR:
Jerome S. Linn

By Smyth & Roston

Attorneys

United States Patent Office 2,898,412
Patented Aug. 4, 1959

2,898,412

THREE PHASE POWER SUPPLY SYSTEM

Jerome S. Linn, Los Angeles, Calif., assignor to Genisco, Incorporated, Los Angeles, Calif., a corporation Application April 22, 1957, Serial No. 654,329

17 Claims. (Cl. 179—171)

The present invention relates to systems for developing electrical energy, and it relates more particularly to a variable frequency system for producing three-phase alternating current energy whose frequency can be adjusted down to a value approaching zero.

There are at present many driving instrumentalities and other apparatus which require variable alternating current energy. For example, copending application Serial No. 645,072, filed March 11, 1957, in the name of Andrew Bekey and assigned to the same assignee as the present application, disclosed and claims a particular and improved type of three-phase differential alternating current motor. The Bekey motor exhibits variable speed characteristics, and it requires a three-phase variable frequency control signals to control its speed. Also, as described in the Bekey application, it is desirable that the three-phase alternating current control signal introduced to the motor be adjustable down to a value approaching zero frequency or direct current.

The system of the present invention is eminently suited to constitute a source for the three-phase control energy required for variable speed differential motors of the type described in the copending Bekey application referred to above. The system of the present invention, however, finds general application wherever an efficient, balanced three-phase source of alternating current of relatively high energy content is required. The system has an additional feature in that it may be constructed to exhibit constant current characteristics for applications where such are required. Moreover, the system is capable of exhibiting a variable frequency in a low frequency range and which is adjustable down to essentially zero.

A major problem that has confronted the art in the production of low frequency alternating current energy has been that of amplification. For example, a low frequency variable frequency three-phase alternating current that is adjustable essentially to zero frequency may most conveniently be provided by an electronic phase shift resistance-capacitance oscillator. However, the output of such an oscillator requires amplification to provide sufficient energy content for many applications to which its output is required to be placed. The amplification of low frequency and direct current energy with reasonable efficiency and without the establishment of unwanted direct current axes has proved to be extremely difficult.

One system that has been suggested, for example, is a carrier system in which the low frequency energy is modulated on a high frequency carrier, and in which the modulated signal is amplified in usual transformer-coupled cascade amplifiers for subsequent demodulation. However, when such a system is used to develop a balanced three-phase output, its efficiency has been found to drop to around ten percent. Also, systems of this general type tend to be extremely complicated and costly.

The use of resistance-coupled amlifiers for the amplification of low frequency alternating current energy is a standard technique. However, when this type of amplifier is used to produce a balanced three-phase output, the resulting system also is relatively complicated and costly and also exhibits an efficiency of the order of ten percent.

An important object of the present invention is to provide an improved system in which three-phase alternating current energy is amplified with a relatively high degree of efficiency, and which system provides a balanced three-phase output whose frequency may be adjusted to essentially zero. The invention achieves this object by the use of the modulation principles described above. These modulation principles are applied in a unique and improved system which enables the desired three-phase balanced output to be obtained without undue loss in efficiency and without the need for costly and complicated components and circuitry.

In the system of the present invention, a modulated signal in each of three 120° displaced phases is detected, and the resulting low frequency energy is amplified in a separate output amplifier which operates in a manner somewhat similar to the push-pull type of amplifier. The three separate output amplifiers are connected to a three-phase load, in a manner to be described, to provide balanced characteristics for the output energy. Then, by the suitable control of the frequency of a three-phase oscillator which develops the low frequency modulating energy, the frequency of the amplified three-phase energy supplied to the load can be controlled and this frequency can be reduced essentially to zero without an excessive loss in efficiency in the system.

The system of the invention is relatively simple and inexpensive in its construction, and it utilizes standardized components. Also, the output amplifiers of the system may use constant current electron tubes, such as pentodes, so that it exhibits a constant current characteristic for the many applications where such a characteristic is desired.

The system may also conveniently include an automatic bias control. Such a control renders the amplitude of the three-phase low frequency output energy of the system essentially independent of parameters and of other changes in the system. This control, therefore, serves to stabilize the system and to hold the amplitude of each phase of the three-phase output energy essentially constant.

As noted above, low frequency electrical energy, such as is required in the intended environment of the present invention, can most conveniently be generated by an electronic resistance-capacitance phase-shift oscillator. Here also, difficulties have presented themselves in the prior art when it was attempted to construct such oscillators for three-phase generation. Most of these problems have occurred in the attempts to control the oscillator so that each phase of the three-phase output will be at all times maintained at the amplitude of the other phases of the output energy. The present invention provides a simple and improved locking or stabilizing circuit in a three-phase resistance-capacitance oscillator. This stabilizing circuit functions to control each section of the oscillator to prevent any tendency for the amplitude of any phase of the three-phase output energy to change with respect to the other phases. This enables the oscillator to generate an output signal that is made up of three components of precisely the same amplitude, and which are phase displaced by 120° from one another. This composition of the output signal is essential for satisfactory three-phase operation of the equipment controlled thereby.

Another feature of the invention is the provision of a simple diode circuit in the modulator section of the system. This simple circuit enables the three-phase output energy from the oscillator to be satisfactorily modulated on a carrier of relatively high frequency for subsequent amplification in the system.

Other features, objects and advantages of the improved system of the present invention will become apparent from a consideration of the following description of one embodiment of the invention, and when such description is taken in conjunction with the accompanying drawings, in which.

Figure 4:
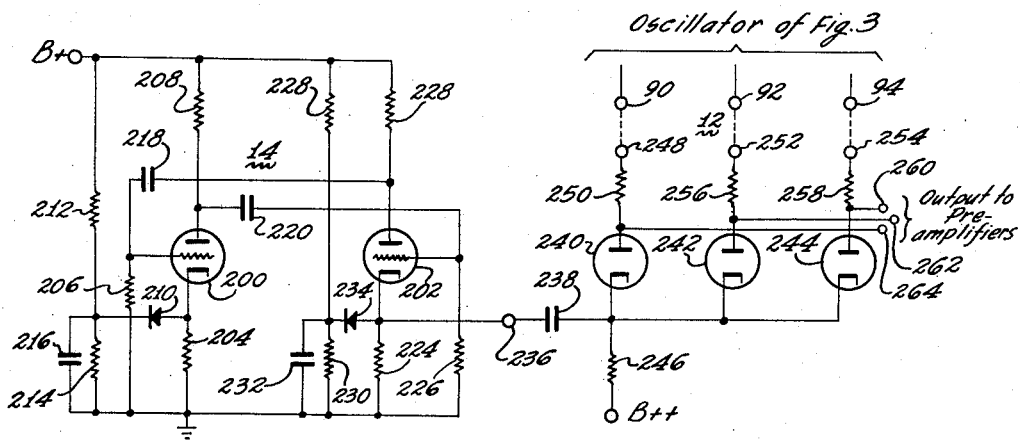
Figure 4 is a circuit diagram of the carrier frequency oscillator which may be included in the system of Figure 1, and also illustrating a simple diode modulator circuit that may be used to modulate the three-phase signal from the oscillator of Figure 3 on the carrier from the carrier frequency oscillator.
Figure 6:
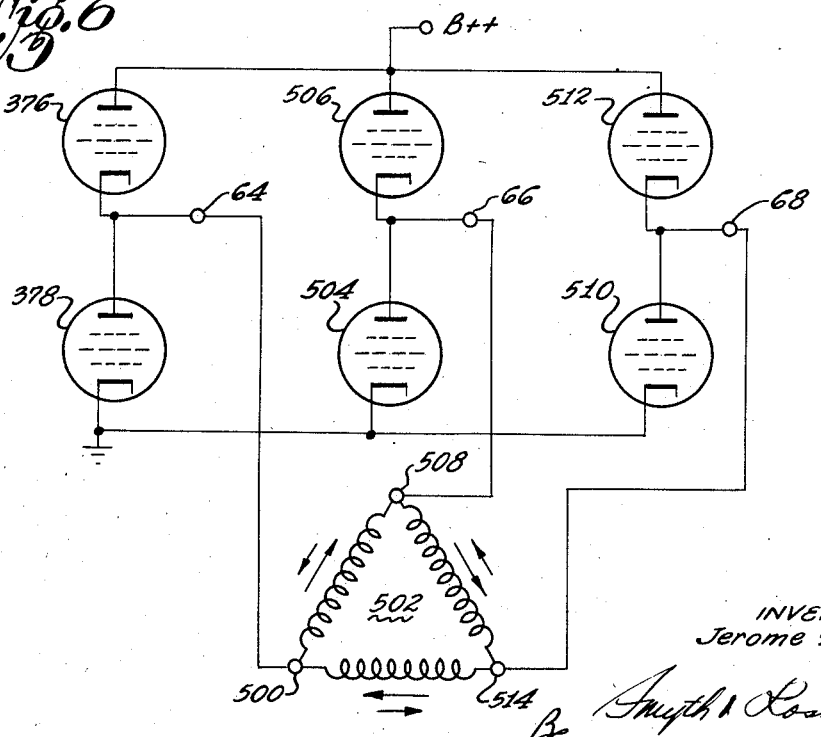
Figure 5:
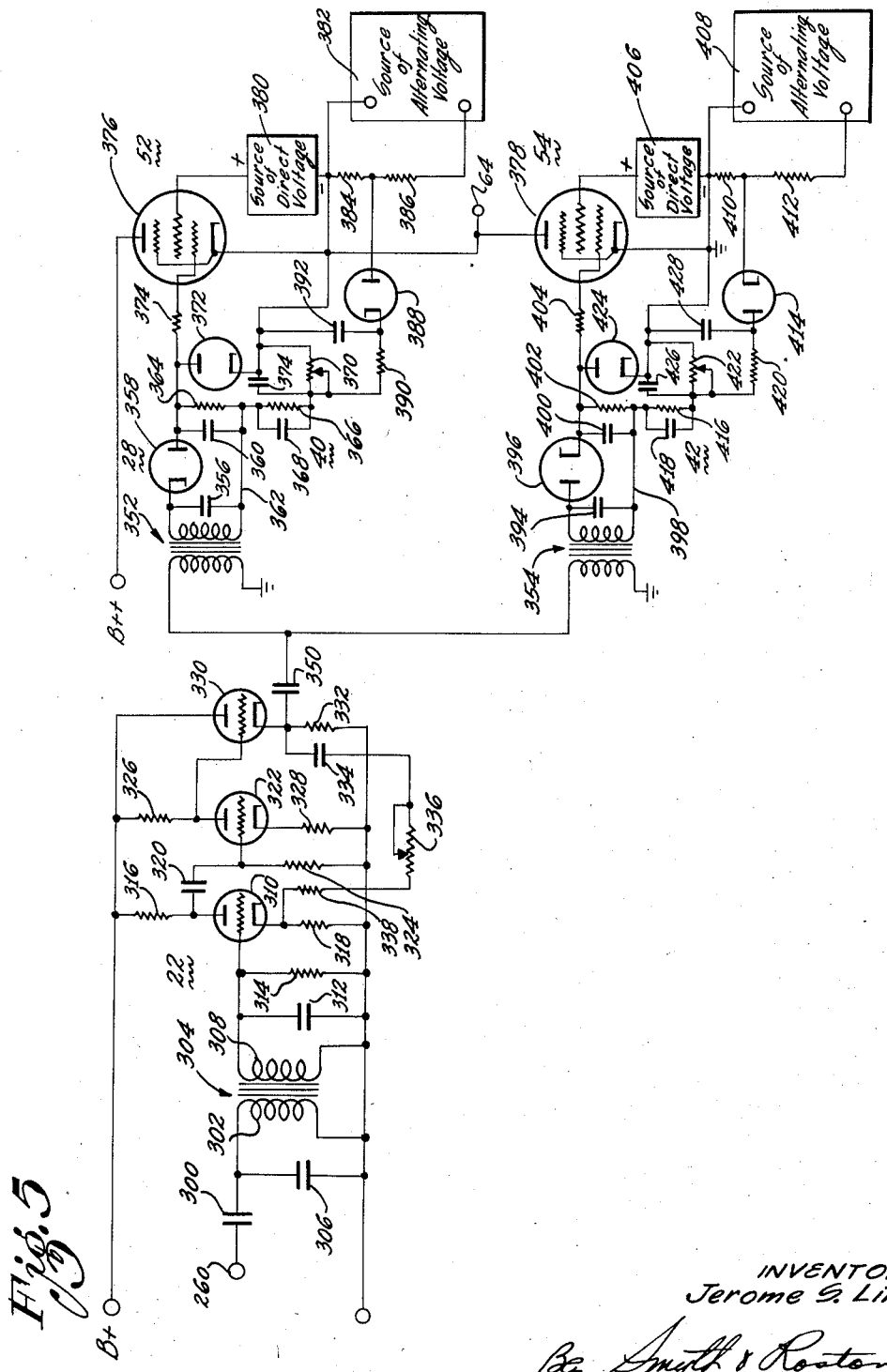

Figure 5 is a circuit diagram of a preamplifier and detector-amplifier utilized for each of the three components of the modulated output developed by the modulator of Figure 4, this diagram showing the push-pull type of output amplifier and also showing automatic bias control means for controlling the bias of the output amplifier to render the amplitude of the output energy essentially independent of variation in the parameters of the system; and Figure 6 is a schematic diagrammatic representation of the three output amplifiers of the system connected to a three-phase load, this latter figure being helpful in describing the balanced manner in which the system of the invention supplies three-phase alternating current control energy to a three-phase load.

Figure 1:
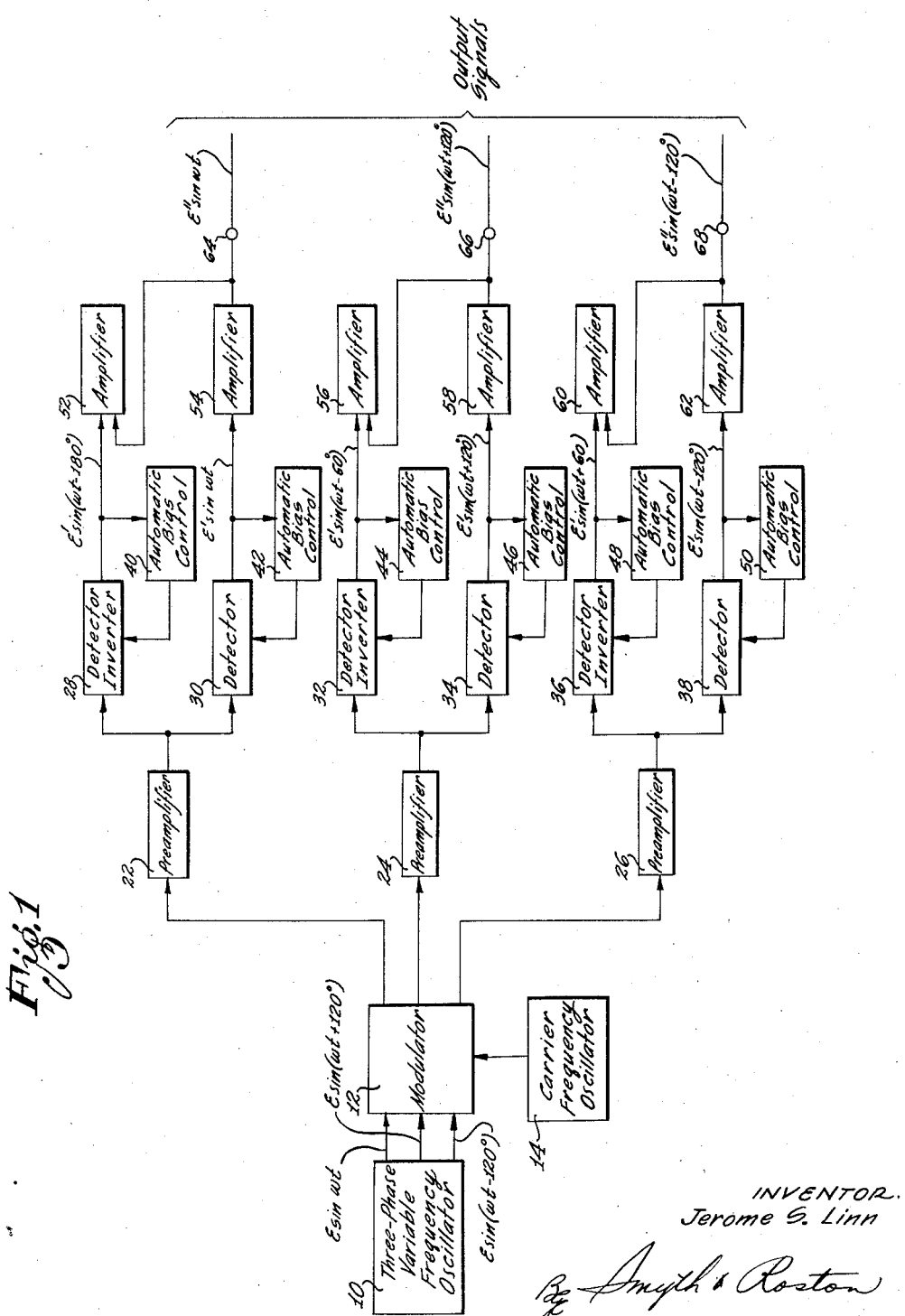
Figure 1 is a block diagram of a complete system embodying one aspect of the present invention; this system including a three-phase electronic oscillator, a carrier frequency oscillator, a modulator, three preamplifiers, and a separate detector-amplifier coupled to each preamplifier.

The system of the invention as shown in Figure 1 includes a three-phase variable frequency oscillator 10 which will be described in detail subsequently. The oscillator 10 is connected to a modulator 12, which also will be described, as is a carrier frequency oscillator 14.

Three pre-amplifiers 22, 24 and 26 are connected to the output terminals of the modulator 12. The preamplifier 22 is connected to a detector-inverter 28 and to a detector 30. These detector units, and the other stages associated with them, will be described in detail subsequently. The pre-amplifier 24, likewise, is connected to a detector-inverter 32 and to a detector 34. The detector-inverter 32 may be constructed in a manner similar to the unit 28, and the detector 34 may be like the detector 30. In like manner, the pre-amplifier 26 is connected to a detector-inverter 36 and to a detector 38. Again, the detector-inverter 36 may be like the units 28 and 32, and the detector 38 may be like the units 30 and 34. For these reasons, only the circuit connections of the detector-inverter 28 and the detector 30, and of their subsequent stages, will be shown and described.

An automatic bias control 40 is associated with the detector-inverter 38 and serves effectively to maintain the maximum amplitude of the output signal from that detector essentially constant. For the same reasons, automatic bias controls 42, 44, 46, 48 and 50 are respectively associated with the detector units 30, 32, 34, 36 and 38.

The detector-inverter 28 is connected to an amplifier 52, and the detector 30 is connected to an amplifier 54. These amplifiers are connected in a manner to be described to exhibit essentially push-pull characteristics. In like manner, the detector-inverter 32 is connected to an amplifier 56, and the detector 34 is coupled to an amplifier 58, these last two amplifiers being connected in a manner similar to the amplifiers 52 and 54. Similarly, the detector units 36 and 38 are respectively coupled to a pair of amplifiers 60 and 62, these latter amplifiers being connected together in a manner similar to the amplifiers 52 and 54, and to the amplifiers 56 and 58. The amplifiers 52 and 54 are connected to a first output terminal 64. The amplifiers 56 and 58 are connected to a second output terminal 66. Finally, the amplifiers 60 and 62 are connected to a third output terminal 68. These output terminals, for example, may be connected to a three-phase delta connected inductive load, as shown in Figure 6.

The variable frequency oscillator 10, in a manner to be described, produces three equal-amplitude alternating current signals which are displaced in phase from one another by 120°. These signals, therefore, together, constitute a three-phase output. The frequency of the oscillator 10 is adjustable down to essentially zero. As described above, it is not expedient for the oscillator itself to develop signals having a sufficient energy content for many control purposes. It is necessary, therefore, to amplify the output energy from the oscillator 10. However, due to the fact that this energy may have an extremely low frequency, amplification problems arise.

In the system disclosed in Figure 1, the problems referred to above are overcome by first modulating the three-phase energy from the oscillator 10 on a higher frequency wave from the oscillator 14. This modulation takes place in the modulator 12. The frequency of the carrier signal from the oscillator 14 is relatively high and may be of the order of 5.4 kilocycles, for example, and this carrier may have a peak-to-peak amplitude of 40 volts. The carrier from the oscillator 14 is preferably of square wave-form to facilitate the modulation process in the modulator 12. The frequency of the three-phase alternating-current output energy from the oscillator 10, on the other hand, is relatively low and may extend from two-tenths of a cycle per second up to two or three hundred cycles per second.

The modulator 12 produces three distinct output signals, each constituting one phase of the output energy from the oscillator 10 and each modulated on the carrier from the oscillator 14. For example, the carrier having a signal represented by $E \sin wt$ as its modulation component is introduced to the pre-amplifier 22; the carrier with a signal represented by $E \sin (wt+120°)$ as its modulation component is introduced to the pre-amplifier 24; and the carrier having a signal modulated on it as represented by $E \sin (wt-120°)$ is introduced to the pre-amplifier 26.

A suitable low-pass filter (not shown) may be interposed between individual ones of the pre-amplifiers and the modulator to attenuate the harmonic content of the carrier so that its square wave form is changed to be substantially sinusoidal. This filtering of the carrier obviates any tendency for the production of parasitic signals and other unwanted disturbances in the subsequent stages of the system.

The three modulated output signals from the modulator 12 are applied to respective ones of the pre-amplifiers 22, 24 and 26. These pre-amplifiers function to amplify each of the modulated carriers.

The amplified modulated carrier from the pre-amplifier 22 is applied to the detector-inverter 28 and to the detector 30. These two units operate to produce a pair of signals corresponding to the modulation component of that amplified modulated carrier. The signal from the detector-inverter 28 is in phase opposition to the modulation component, and the signal from the carrier 30 is in phase with the modulation component. That is, the detector-inverter 28 produces a signal represented by $E'\sin(wt-180°)$, and the detector 30 produces a signal represented by $E'\sin wt$.

The amplifiers 52 and 54 are connected in series between the positive terminal of a direct-current exciting source and ground in a manner to be more fully explained subsequently. The signal from the detector-inverter 28 is introduced to the amplifier 52, and the signal from the detector 30 is introduced to the amplifier 54. An amplified signal corresponding to the in-phase signal from the detector 30 is derived at the output terminal 64 which is connected to the common junction of the amplifiers 52 and 54.

In like manner, the detector-inverter 32 and the detector 34 produce a pair of signals respectively in phase with and in phase opposition to the modulation component of the amplified modulated carrier from the pre-amplifier 24. That is, the detector-inverter 32 produces a signal that may be represented by $E'\sin(wt-60°)$; and the detector 34 produces a signal that may be represented by $E'\sin(wt+120°)$. Also in like manner, an amplified signal corresponding to the in-phase signal from the detector 34 is developed by the amplifiers 56 and 58 at the output terminal 66.

The detector-inverter 36 produces a signal in phase opposition to the modulation component of the amplified modulated carrier from the pre-amplifier 26. This signal may be represented by $E'\sin(wt+60°)$. The detector 38, on the other hand, produces a demodulated signal that is in phase with the modulation component of the modulated carrier from the pre-amplifier 26. This latter signal may be represented by $E'\sin(wt-120°)$. In a manner similar to the amplifiers 52 and 54, the amplifiers 60 and 62 produce an amplified signal at the output terminal 68 which is in phase with the signal from the detector 38.

An output signal is developed at the terminal 64, therefore, which may be expressed as $E''\sin wt$; an output signal is developed at the terminal 66 which may be expressed as $E''\sin(wt+120°)$; and an output signal is developed at terminal 68 which may be expressed as $E''\sin(wt-120°)$. These three output signals constitute the three-phase amplified output energy of the system.

When the terminals 64, 66 and 68 are connected, for example, to a usual delta-connected three-phase load, as will be described in detail hereinafter, the three-phase output energy may be varied in a low frequency range, and it may be reduced in frequency essentially to zero. The system of the invention functions to amplify this energy efficiently to the required energy level, and yet the three-phase amplified energy is produced on a zero direct-current axis as is desired for normal three-phase utilization means.

Figure 2:
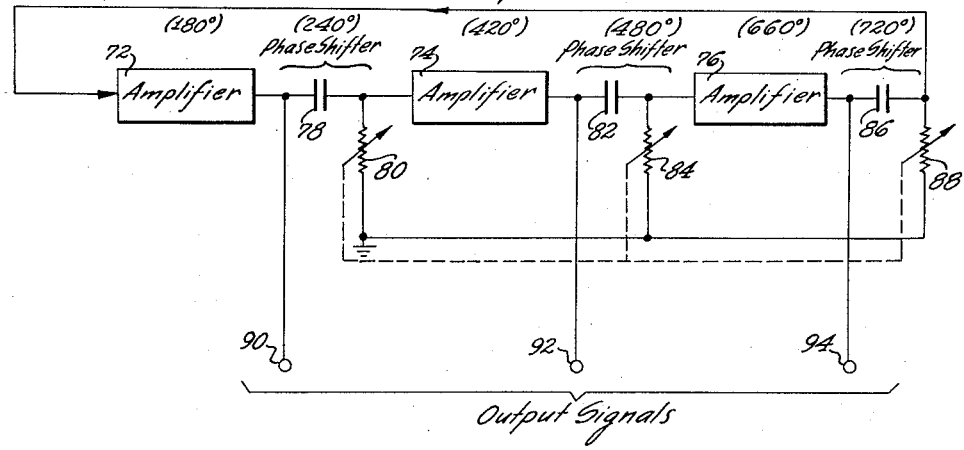
Figure 2 is a diagram, partially in block form and partially schematic, indicating a three-phase electronic phase-shift oscillator incorporating certain principles of the invention and which may be included in the system of the invention shown in Figure 1.

As noted above, the three-phase variable-frequency oscillator 10 is shown schematically in Figure 2. This oscillator includes a first amplifier 72, a second amplifier 74, and a third amplifier 76, these amplifiers being connected in cascade and constituting a capacitance-coupled three-stage amplifying system.

A first phase-shifting network is interposed between the amplifiers 72 and 74. This phase-shifting network includes a series capacitor 78 and a variable resistor 80, the variable resistor being connected between the input terminal of the amplifier 74 and ground. A second phase-shifting network is interposed between the amplifiers 74 and 76. This second phase-shifting network includes a series capacitor 82 and a variable resistor 84. The resistor 84 is connected between the input terminal of the amplifier 76 and ground. Finally, a third phase-shifting network is interposed between the output terminal of the amplifier 76 and the input terminal of the amplifier 72. This latter phase-shifting network includes a series capacitor 86 and a grounded variable resistor 88, the resistor being connected to the input terminal of the amplifier 72.

A first oscillator output terminal 90 is connected to the output terminal of the amplifier 72, a second oscillator output terminal 92 is connected to the output terminal of the amplifier 74, and a third oscillator output terminal 94 is connected to the output terminal of the amplifier 76.

Assume that each of the amplifiers 72, 74 and 76 is a single-stage type, and that each produces the usual 180° phase-shift to the signals translated through it. Also, assume that each of the phase-shifting networks 78, 80, 82, 84, 86 and 88 produces a 60° phase-shift at the frequency to which the oscillator is adjusted. Then, oscillation will be sustained at that frequency in the closed loop system of Figure 2. This obtains because the output signal from the amplifier 76, after passing through the phase-shifting network 86 and 88 at that particular frequency is phase-shifted by 720° with respect to the input signal to the amplifier 72 and is, therefore, in phase with that input signal and of the proper phase to sustain oscillation in the system.

The three resistors 80, 84 and 88 are mechanically intercoupled for unicontrol. The simultaneous control of the three resistors 80, 84 and 88 controls the frequency of the oscillator in accordance with known phase-shift resistance-capacity oscillator principles. There are produced across the output terminals 90, 92 and 94, therefore, three output signals which are mutually displaced by 120° to constitute a usual three-phase output. The frequency of this three-phase output may be conveniently adjusted by adjusting the values of the resistors 80, 84 and 88 in unison. Such adjustment, in accordance with known phase-shift principles changes the frequency at which the three phase-shifting networks produce signals of the proper phase to sustain oscillation in the system.

In oscillators of the type described above, difficulties have been encountered in precisely maintaining each of the three signals at the output terminals 90, 92 and 94 at precisely the same amplitude in the presence of parameter changes in the system. It is essential, as previously pointed out, that such equal amplitude relation be maintained for proper three-phase operation of the instrumentality using the three-phase energy from the system. The oscillator of the present invention, as illustrated in Figure 3, incorporates a stabilizing or locking network, which will be described, and this network serves to hold the three phases of the oscillator output energy at precisely equal amplitudes for proper three-phase operation.

Figure 3:
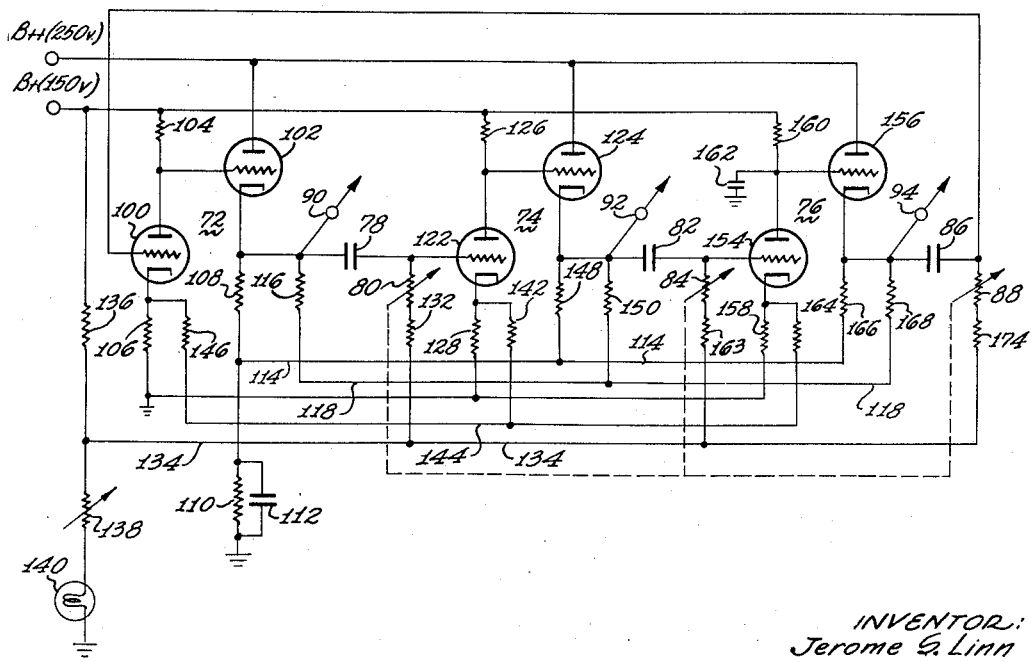
Figure 3 is a circuit diagram of a three-phase variable-frequency electronic phase-shift oscillator embodying the principles of the system of Figure 2, and which oscillator incorporates a locking or stabilizing circuit to sustain equal amplitudes in each phase of the output from the oscillator so as to maintain optimum operation at any particular frequency to which the oscillator may be adjusted.

The oscillator of Figure 3 includes an electron discharge tube 100 which is preferably a triode and which, together with a second triode 102, are connected to constitute the amplifier 72 of Figure 2. A resistor 104, which may have a value of 5.1 kilo-ohms, is connected between the anode of the tube 100 and the positive terminal of a source of direct-current exciting potential and which may have a value of 150 volts. This terminal is designated as B+. A resistor 106, which may have the value of 2.2 kilo-ohms, is connected to the cathode of the tube 100 and to a point of reference potential or ground.

The tube 102 is connected as a cathode follower, and its anode is directly connected to the positive terminal B++ of a second source of direct-current exciting potential. This latter source may, for example, have a value of 250 volts. The anode of the tube 100 is directly connected to the control grid of the tube 102. The cathode of the tube 102 is connected to one terminal of a resistor 108 having a value of 4.7 kilo-ohms. The other terminal of the resistor 108 is connected to the ungrounded side of a grounded resistor 110. This latter resistor may have a value of 5.1 kilo-ohms, and it is shunted by a capacitor 112. A common connecting lead 114 is connected to the common junction of the resistors 108 and 110.

The oscillator output terminal 90 is connected directly to the cathode of the tube 102. A balancing resistor 116 is connected to the cathode of the tube 102 and to a common connecting lead 118.

The series capacitor 78 of the first phase-shifting network is connected between the cathode of the tube 102 and the control grid of an electron discharge tube 122. This capacitor may have a value of 1 microfarad. The latter tube, together with an electron discharge tube 124 constitute the second amplifier 74 of Figure 2. Both these tubes may be triodes, as illustrated.

A resistor 126 which may have a value of 5.1 kilo-ohms, connects the anode of the tube 122 to the positive terminal B+. A resistor 128, which may have a value of 2.2 kilo-ohms, is connected between the cathode of the tube 122 and ground.

The control grid of the tube 122 is connected to one terminal of the variable resistor 80 of the first phase-shifting network. This resistor may have a maximum resistance of 500 kilo-ohms. A resistor 132 is connected between the other terminal of the variable resistor 80 and a common connecting lead 134, this latter resistor having a resistance of 30 kilo-ohms. The lead 134 is connected to the common junction of a pair of resistors 136 and 138. These resistors 136 and 138, together with a 6-watt 110-volt ballast tube 140, are connected in series between the positive terminal B+ and ground. The resistor 136 may have a value of 22 kilo-ohms, and the resistor 138 is variable and may have a maximum value of 600 kilo-ohms. These resistors form a voltage divider across the 150 volt source of direct-current exciting potential, and they function to establish a stabilized positive voltage of, for example, +8.5 volts on the lead 134. This voltage functions to provide a slight positive bias for the control grids of the tubes making up the amplifiers of the system.

The anode of the tube 122 is directly connected to the control grid of the tube 124, and a resistor 142 connects the cathode of the tube 122 to a common lead 144. A resistor 146 connects the cathode of the tube 100 to this common lead, and the resistors 142 and 146 may each have a value of 18 kilo-ohms.

The tube 124 is connected as a cathode follower, and its anode is directly connected to the positive terminal B++. A resistor 148 is connected between the cathode of the tube 124 and the common lead 114, and this resistor may have a value of 4.7 kilo-ohms. The output terminal 92 is connected to the cathode of the tube 124, and this cathode is connected to a resistor 150 which, in turn, is connected to the common lead 118. The resistor 150 may have a value of 10 kilo-ohms.

The cathode of the tube 124 is further connected to one side of the capacitor 82 in the second phase-shifting network which has, for example, a value of 1 microfarad. The other side of the capacitor 82 is connected to the control grid of an electron discharge tube 154. The variable resistor 84 of the second phase-shifting network and a resistor 163 are connected between the control grid of the tube 154 and the lead 134. The resistor 84 may have a maximum resistance of 500 kilo-ohms, and the resistor 163 may have a resistance of 30 kilo-ohms. The tube 154, together with an electron discharge tube 156 constitute the amplifier 76, and these tubes may be triodes. A resistor 158 is connected to the cathode of the tube 154 and to ground, and this resistor may have a value of 2.2 kilo-ohms.

The anode of the tube 154 is connected to one terminal of a resistor 160, the other terminal of this resistor being connected to the positive terminal B+. The resistor 160 has a value of 5.1 kilo-ohms, for example. A capacitor 162 is connected between the anode of the tube 154 and ground. This latter capacitor may be connected between the anodes of any of the tubes 100, 122 and 154 and ground, and it serves to by-pass high frequency parasitic signals. It has, for example, a value of 330 micromicrofarads. A resistor 164 is connected from the cathode of the tube 154 to the common lead 144, and this resistor may have a value of 18 kilo-ohms.

The anode of the tube 154 is directly connected to the control grid of the tube 156. The tube 156 also is connected as a cathode follower, and its anode is directly connected to the positive terminal B++. The output terminal 94 is connected to the cathode of the tube 156. The cathode of the tube 156 is also connected to a resistor 166 of, for example, 4.7 kilo-ohms, and this resistor is connected to the common lead 114. In like manner, a resistor 168 of, for example, 10 kilo-ohms is connected between the cathode of the tube 156 and the common lead 118.

The capacitor 86 of the third phase-shifting network is connected between the cathode of the tube 156 and the control grid of the tube 100. This capacitor may, for example, have a capacity of 1 microfarad. The variable resistor 88 and a resistor 174 are connected in series between the control grid of the tube 100 and the common lead 134. The resistor 88 may have a maximum value of 500 kilo-ohms, and the resistor 174 may have a value of 30 kilo-ohms.

The resistors 104, 126 and 160 respectively connected to the anodes of the tubes 100, 122 and 154 are made sufficiently large, as are the resistors 106, 128 and 158 respectively connected to the cathodes of these tubes so that the tubes exhibit just enough amplification to sustain oscillation in the system. The values of these resistors with respect to the internal impedance of the tubes themselves is sufficiently large so that variations in the tube characteristics have no material effect on the overall characteristics of the oscillator system or on the amplitude of the output signals. The tubes 100, 122 and 154 are so heavily degenerative because of their cathode resistors that their respective grids are returned to a positive potential point, rather than to ground in order that the tubes may be operated at their proper operating points. This positive potential point is constituted by the lead 134 which, as noted above, is established at an adjustable positive voltage by the resistors 136 and 138. This positive voltage may be of the order of 8.5 volts (as previously noted), and it is controllable by varying the resistor 138.

Due to the fact that the anodes of the tubes 100, 122 and 154 are directly coupled to the control grids of their corresponding cathode follower tubes 102, 124 and 156, the cathodes of the cathode follower tubes must be established at a positive potential so that their control grids may be negative with respect thereto for proper operation of the cathode followers. This positive potential is provided by the network of the resistor 110 and its shunting capacitor 112. This network responds to the direct-current flow through the tubes 102, 124 and 156 to establish a positive direct voltage of the order of 100 volts on the common lead 114. This positive voltage provides the correct operating voltage for the cathode follower tubes. These cathode followers provide in usual manner an appropriate coupling between the amplifier tubes and the respective output terminals 90, 92 and 94, and they enable the oscillator to feed to a low impedance load without unduly loading any of the oscillator tubes 100, 122 and 154.

The three signal components developed at the output terminals 90, 92 and 94 are of the same amplitude and are mutually displaced by 120° for usual three-phase operation. These signals, therefore, at any instant effectively add to zero across the resistor-capacity network 110 and 112. Therefore, no unwanted feed back effects are caused by this network. This also applies to the resistor 138 and ballast tube 140, across which all three signal components are impressed.

In the system of Figure 3, provisions are made to hold the signals at the output terminals 90, 92 and 94 precisely at the same amplitude with respect to one another, which equal amplitudes are essential for proper three-phase operation. This is achieved by the resistors 116, 150 and 168 which connect the cathodes of the tubes 102, 124 and 156 to the common lead 118; and also by the resistors 146, 142 and 164 which connect the cathodes of the tubes 100, 122 and 154 to the common lead 144. These two groups of resistors respectively constitute a Y connected three-phase balancing load for the three tubes 100, 122 and 154; and a Y connected three-phase balancing load for the three tubes 102, 124 and 156. Any tendency for the amplitude of the signal component at the cathode of any one of these tubes to change with respect to the amplitudes of the signal components at the cathodes of the other tubes in its group, sets up balancing currents in the corresponding Y connected balancing load which tend to equalize these amplitudes.

For example, should the signal component at the output terminal 90 tend to increase in amplitude, the resulting current flow through the resistors 150 and 168 is in a direction to increase the cathode voltage of the tubes 124 and 156. This tends to increase the amplitude of the signal components at the output terminals 92 and 94, and it tends to decrease the amplitude of the signal component at the terminal 90, until an equal-amplitude condition again is reached.

In a similar manner, the balancing load formed by the resistors 146, 142 and 164 functions to control the cathode biases on the tubes 100, 122 and 154. These resistors tend to maintain the signals amplified by these tubes at the same relative amplitude despite changes in the parameters of the tubes and their associated circuits.

Therefore, the amplitudes of the three-signal components of the three-phase energy developed by the system of Figure 3 are precisely held at essentially equal amplitudes by the inherent nature of the circuit. Therefore, although the signals developed at the output terminals 90, 92 and 94 are essentially independent of one another, they are held precisely at the proper amplitude and phase relation for the correct three-phase operation of the oscillator. Therefore, the oscillator develops at the terminal 90 an output signal component that may be represented by $E \sin wt$; it develops at the output terminal 92 an output signal component which may be represented by $E \sin (wt.+120°)$; and it develops at the output terminal 94 an output signal component which may be represented by $E \sin (wt-120°)$. As described above, these three output signal components are precisely held in this phase and amplitude relationship for appropriate three-phase operation.

A pair of triodes 200 and 202 in Figure 4 are connected to constitute a known type of multivibrator circuit, and these tubes cooperate to make up the square-wave carrier frequency oscillator 14 of Figure 1.

A resistor 204 is connected from the cathode of the tube 200 to ground, and a resistor 206 is connected from its control grid to ground. The anode of the tube 200 is connected to a resistor 208 which, in turn, is connected to the positive terminal B+ of a source of direct current exciting voltage of, for example, 330 volts. The resistor 204 may have a value of 82 kilo-ohms, the resistor 206 may have a value of 270 kilo-ohms and the resistor 208 may have a value of 150 kilo-ohms. The tubes 200 and 202 may together make up a double triode of the type presently designated a 12AU7.

A diode 210 (which may be a crystal designated as a 1N63) has its anode connected to the cathode of the tube 200, and the cathode of this diode is connected to the common junction of a pair of resistors 212 and 214. These resistors are connected as a voltage divider across the direct current exciting potential source. The resistor 214 is shunted by a capacitor 216. The resistor 212 may have a value of 470 kilo-ohms, the resistor 214 may have a value of 68 kilo-ohms and the capacitor 216 may have a value of 0.25 microfarad.

The anode of the triode 202 is coupled through a capacitor 218 to the control grid of the triode 200, and the anode of the triode 200 is coupled through a capacitor 220 to the control grid of the triode 202. These capacitors may each have a value of 330 micromicrofarads.

A resistor 222 is connected between the anode of the tube 202 and the positive terminal B+, and this resistor may have a value of 150 kilo-ohms. A resistor 224 is connected to the cathode of the tube 202 and to ground, and a resistor 226 is connected from the control grid of that tube to ground. The resistor 224 may have a value of 82 kilo-ohms, and the resistor 226 may have a value of 270 kilo-ohms.

A pair of resistors 228 and 230 are connected as a voltage divider across the direct current exciting source, and the resistor 230 is shunted by a capacitor 232. A diode 234 (which also may be an 1N63) has its anode connected to the cathode of the tube 202 and has its cathode connected to the common junction of the resistors 228 and 230. The resistor 228 may have a value of 470 kilo-ohms, the resistor 230 may have a value of 68 kilo-ohms, and the capacitor 232 has a value of 1 microfarad.

The multivibrator described above is of known construction and a detailed description of the operation of this unit is believed to be unnecessary. As noted above, the multivibrator functions as a square-wave carrier oscillator, and it develops a 5.4 kilocycle signal with an amplitude of 40 volts peak-to-peak. The diodes 210 and 234 and their associated circuitry function in known manner to stabilize the multivibrator and to provide an output signal of well-defined square-wave configuration.

The cathode of the tube 202 is connected to the output terminal 236 of the multivibrator, and this output terminal is connected to one side of a coupling capacitor 238 of, for example, .022 microfarad. The other side of this capacitor is connected to the cathodes of three diodes 240, 242 and 244 which make up the modulator 12 of Figure 1. A common resistor 246 connects these cathodes to the positive terminal B+ of a source of direct current exciting potential which may, for example, be established at 100 volts with respect to ground.

The output terminal 90 of the oscillator of Figure 3 is connected to the input terminal 248 of the modulator. The input terminal 248 is connected to a resistor 250 which, in turn, is connected to the anode of the diode 240. The resistor 250 may have a value of 82 kilo-ohms, and the resistor 246 may have a value of 100 kilo-ohms. The value of the latter resistor is made large enough to match the output impedance of the multivibrator directly. This precludes the need for cathode followers or other extraneous coupling stages.

The output terminal 92 of the oscillator of Figure 3 is connected to the input terminal 252 of the modulator, and the output terminal 94 of the oscillator is connected to the input terminal 254 of the modulator. A pair of resistors 256 and 258 respectively connect the input terminals 252 and 254 to the anodes of the diodes 242 and 244. These resistors may each have a value of, for example, 82 kilo-ohms. The output terminals 260, 262 and 264 of the modulator are respectively connected to the anodes of the diodes 240, 242 and 244.

The three output signal components from the oscillator of Figure 3 are established on a direct current axis of, for example, 117 volts to 135 volts. Each of these components is introduced to a respective one of the diodes 240, 242, 244 to plate-modulate the carrier which is applied across the common resistor 246 and thereby introduced to the cathodes of these diodes. The resulting current flow through each of the diodes causes modulated signal components to appear across each of the resistors 250, 256 and 258.

Since the three signal components effectively add up to a constant at any instant across the common resistor 246, there is no danger of these signal components being fed back to the carrier multivibrator 14.

The carrier appears, therefore, at each of the three output terminals 260, 262 and 264, as an independent signal modulated by a signal component corresponding to a respective one of the three phases of the oscillator of Figure 3. As described in Figure 1, these independent modulated signals from the output terminals 260, 262 and 264 are translated through respective filters to the pre-amplifiers 22, 24 and 26. Only the pre-amplifier 22 and its subsequent stages are shown in Figure 5. This is because the pre-amplifier 24 and its subsequent stages, and the pre-amplifier 26 and its subsequent stages, may be similarly constructed.

The pre-amplifier 22 may comprise a plurality of degenerative cascaded resistance coupled amplifiers. As noted above, although only one of the amplifiers is shown in Figure 5, it is contemplated that three such amplifiers 22, 24 and 26 (Figure 1) will be used in the system. These amplifiers are made highly degenerative so that they will exhibit a high degree of stability. That is, each individual amplifier is constructed to amplify its corresponding phase of the three-phase energy a predetermined amount, and that the amplification of the various phases will not vary due to changes in parameters of the individual amplifier circuits.

The output terminal 260 of the modulator in Figure 4 is connected to a coupling capacitor 300 which may have a capacity of, for example, .01 microfarad. The other side of the capacitor 300 is connected to one side of the primary winding 302 of a coupling transformer 304, the other side of this winding being grounded. A capacitor 306 of, for example, .01 microfarad is shunted across the primary winding 302.

One side of the secondary winding 308 of the transformer 304 is connected to the control grid of a triode 310, and the other side of this winding is grounded. The turn ratio of the primary and secondary windings of the transformer 304 may, for example, be 1:2. A capacitor 312 is shunted across the secondary winding 308, and this capacitor may have a capacity of 2,000 micromicrofarads.

The capacitor 312 tunes the secondary winding of the transformer 304 to the frequency of the carrier signal from the oscillator 14. The resulting tuned network functions as a band pass filter which passes only the carrier from the modulator and its modulation side bands. However, the high frequency parasitic signals due to the original square wave configuration of the carrier are not passed by the network, and the carrier assumes essentially a sine wave configuration. The capacitor 306 provides a low impedance attenuating path for the higher harmonics of the square wave carrier. The resistor 314 broadens the pass band of the filter so that it will not be unduly selective. This allows the carrier frequency to shift to some extent without adverse effects.

A resistor 314 is connected between the control grid of the triode 310 and ground. This resistor may have a resistance of 33 kilo-ohms. The anode of the triode 310 is connected to one terminal of a resistor 316, the other terminal of this resistor being connected to the positive terminal B+ of a source of direct voltage. A resistor 318 is connected between the cathode of the triode 310 and ground. The resistor 316 may have a value of 100 kilo-ohms, and the resistor 318 may be a 1 kilo-ohm resistor.

A capacitor 320 of .01 microfarad couples the anode of the triode 310 to the control grid of a triode 322, and a 100 kilo-ohm resistor 324 is connected between the control grid of the latter triode and ground. A resistor 326 of 220 kilo-ohms is connected to the anode of the triode 322 and to the positive terminal B+, and a resistor 328 of 1 kilo-ohm connects the cathode of the triode 322 to ground.

The anode of the triode 322 is connected to the control grid of a triode 330. The triode 330 is connected as a cathode follower, its anode being connected to the positive terminal B+. A resistor 332 is connected between the cathode of the triode 330 and ground, and this latter resistor may have a resistance of 1.5 kilo-ohms.

A degenerative loop feedback is provided for the system by a capacitor 334 and a pair of resistors 336 and 338, these elements being connected in series between the cathodes of the triodes 330 and 310. The capacitor 334 may have a value of .01 microfarad, the resistor 336 is variable and may have a value of 25 kilo-ohms, and the resistor 338 may have a value of 15 kilo-ohms. The loop feedback of the system may be conveniently adjusted by the manual adjustment of the resistor 336.

Each of the pre-amplifiers, therefore, may comprise the circuit shown in Figure 5, this circuit being a stable two-stage resistance coupled degenerative amplifier with a cathode follower output stage.

A coupling capacitor 350 of .1 microfarad couples the cathode of the cathode follower triode 330 to one terminal of each of a pair of primary windings respectively associated with a pair of transformers 352 and 354. The other terminal of each of these primary windings is grounded. Each of the transformers may have a secondary to primary turn ratio of 2:1.

The secondary winding of the transformer 352 is shunted by a capacitor 356 of, for example, 150 micromicrofarads. This capacitor serves to eliminate ringing in the transformer. The transformer 352 and its associated circuitry make up the detector-inverter 28 of Figure 1. Also, further associated circuitry which will be described comprises the automatic bias control 40 and the amplifier 52 of Figure 1. It will be evident that similar circuitry can be used for the detector inverters 32 and 36 of Figure 1, and for their associated automatic bias controls and amplifiers.

One side of the secondary winding of the transformer 352 is connected to the cathode of a diode 358. A capacitor 360 is connected between the anode of the diode 358 and a return lead 362. The lead 362 returns the circuit to the lower side of the secondary winding of the transformer 352 and its shunting capacitor 356. The capacitor 360 may have a capacity of .025 microfarad. A resistor 364 is shunted across the capacitor 360, and this resistor has a resistance of 470 kilo-ohms. A further 88 megohm resistor 366 has one terminal connected to the lead 362, and this latter resistor is shunted by a 2 microfarad capacitor 368. These last two elements are included in the automatic bias control 40 of the circuit.

A potentiometer 370 of, for example, 25 kilo-ohms has one of its terminals connected to the other terminal of the resistor 366, and the other terminal of the potentiometer is connected to the cathode of a diode 372. The movable tap of the potentiometer is connected to the first mentioned terminal, and the potentiometer is shunted by a capacitor 374 of, for example, 60 microfarads.

The anode of the diode 372 is connected to the anode of the diode 358, and a limiting resistor 374 is connected between these anodes and the control grid of a pentode 376. The limiting resistor may have a resistance of 3.3 kilo-ohms. The pentode 376 is included in the amplifier circuit 52 of Figure 1. The anode of the pentode 376 is connected to the positive terminal B++ of a source of uni-directional potential of, for example, 600 volts. The suppressor grid of the pentode 376 is connected to its cathode and the cathode is connected to an anode of the pentode 378. The latter pentode is included in the amplifier 54 of Figure 1. The output terminal 64 is connected to the common cathode-anode connection.

The screen grid of the pentode 376 is connected to the positive terminal of a source of direct voltage 380. This source is floating with respect to ground, and its negative terminal is connected to the cathode of the pentode 376.

A source of alternating voltage 382 is provided, and this source is also floating with respect to ground. This source may have a value of 350 volts. A pair of resistors 384 and 386 are connected in series across the output terminals of the source 382 to limit the peak inverse voltage across diode 388. The resistor 384 may have a value of 47 kilo-ohms and the resistor 386 may have a value of 68 kilo-ohms. The terminal of the resistor 384 remote from the resistor 386 is connected to the cathode of the pentode 376 and to the negative terminal of the source of direct voltage 380. The common junction of the resistors 384 and 396 is connected to the anode of a diode 388. The cathode of this diode is connected to one terminal of a 10 kilo-ohm resistor 390, the other terminal of this resistor being connected to the movable tap of the potentiometer 370. A capacitor 392 is connected between the cathode of the diode 372 and the cathode of the diode 388. This capacitor may have a capacity of 60 microfarads.

The secondary winding of the transformer 354 is shunted by a capacitor 394 of 150 micromicrofarads. This capacitor, like the capacitor 356, serves to prevent ringing in the transformer. One side of the secondary winding of the transformer 354 is connected to the anode of a diode 396, and the other side of this winding is connected to a return lead 398. A capacitor 400 of, for example, .025 microfarad is connected between the cathode of the diode 396 and the lead 398. A 470 kilo-ohm resistor 402 is shunted across the capacitor 400.

The cathode of the diode 396 is connected to one terminal of a limiting resistor 404. The other terminal of this resistor is connected to the control grid of the pentode 378. The limiting resistor 404, like the limiting resistor 374, may have a resistance of 3.3 kilo-ohms. The suppressor grid of the pentode 378 is connected to its cathode, and the cathode is grounded. The screen grid of the pentode 378 is connected to the positive terminal of a source of direct voltage 406, the negative terminal of this source being grounded. A source of alternating voltage 408 similar to the source 382 has one terminal connected to ground, and a pair of resistors 410 and 412 are shunted across its output terminal. The resistor 410 may have a value of 33 kilo-ohms and the resistor 412 may have a value of 56 kilo-ohms. The common junction of the resistors 410 and 412 is connected to the cathode of a diode 414. The circuit associated with the diode 396 constitutes the detector 30 of Figure 1, and similar circuits may be used for the detectors 34 and 38.

A resistor 416 of 88 megohms has one terminal connected to the lead 398, and this resistor is shunted by a capacitor 418 having a capacity of 2 microfarads. The elements 416 and 418 are included in the automatic bias control 42 shown in Figure 1 as associated with the detector 30, and a similar arrangement may be used for the controls 46 and 50.

A resistor 420 of, for example, 10 kilo-ohms is connected between the other terminal of the resistor 416 and the anode of the diode 414. A 25 kilo-ohm potentiometer 422 has its first fixed contact connected to the junction of the resistors 416 and 420. The movable tap of the potentiometer 422 is connected to its first fixed contact. The second fixed contact of the potentiometer 422 is connected to the cathode of a diode 424. The anode of this diode 424 is connected to the cathode of the diode 396. A first 60 microfarad capacitor 426 is shunted across the potentiometer 422, and a second 60 microfarad capacitor 428 is connected between the cathode of the diode 424 and the anode of the diode 414.

The pentode 378 and its associated circuit is included in the amplifier 54 of Figure 1, and similar circuits may be used for the amplifiers 58 and 62.

The amplified stabilized modulated signal from the pre-amplifier 22 is introduced through the coupling capacitor 350 to the primary windings of the transformers 352 and 354. The diode 358 serves to rectify and detect the modulated signal, and to produce a particular phase of the modulation component of the modulated signal on a negative axis across the resistor 364. That is, the diode 358 develops a demodulated signal across the resistor 364 that may be designated as $E'$ (sin $wt-180°$). This demodulated signal is introduced to the control grid of the pentode 376.

In like manner, the diode 396 develops on a positive axis a demodulated signal across the resistor 402 that is 180° out-of-phase with respect to the signal developed by the diode 358 across the resistor 364. The phase relation between the demodulated signals developed across the resistor 364 and the resistor 402 is in opposition because the connections to the anode and cathode of the diode 358 are reversed with respect to the similar connections to the anode and cathode of the diode 396. The demodulated signal component appearing across the resistor 402 may, therefore, be represented as $E'$ sin $wt$. This latter signal is applied to the control grid of the pentode 378. The circuits of the diodes 358 and 396 therefore develop a pair of mutually out-of-phase signals which correspond to one component of the three phase energy to be amplified.

Therefore, as the demodulated signal from the diode 358 is positively increasing in instantaneous amplitude, it decreases the internal impedance of the pentode 376 to increase the potential on the output terminal 64. At the same time, the demodulated signal from the diode 396 is increasing in instantaneous amplitude in a negative sense effectively to increase the internal impedance of the pentode 378 also to raise the potential of the output terminal 64. In like manner, decreases in the instantaneous amplitudes of both these demodulated signals serve simultaneously to decrease the potential of the output terminal 64. Therefore, the pentodes 376 and 378 function as a kind of push-pull amplifier in response to the signals applied to them to produce an output signal at the output terminal 64.

The diodes 372 and 424 function as clampers and assist the limiting resistors 374 and 404 in preventing high amplitude signals to drive the control grids of the tubes 376 or 378 positive with respect to their cathodes. Any such tendency causes one or the other of these diodes to become conductive to thereby constitute a low impedance path between the control grid and cathode of the corresponding pentode for the peaks of such high amplitude signals.

Due to the polarity of the diode 358, the signal appearing across the resistor 364 tends to develop a negative bias in the pentode 376 to establish a proper operating bias for this pentode, the control grid of the pentode is returned to a constant value positive biasing source. This positive source constitutes the circuit of the diode 388, which circuit rectifies the alternating voltage from the source 382 and which appears across the resistor 384. The rectified voltage appears across the resistor 390 and the potentiometer 370 which are connected as a voltage divider. The voltage is filtered by the capacitors 374 and 392. An adjustable direct positive voltage appears, therefore, at the junction of the potentiometer 370 and the resistor 390. The control grid circuit for the pentode 376 is returned to this positive voltage. The bias on the pentode may, therefore, be manually set by adjusting the variable tap on the potentiometer 370.

The positive peaks of the demodulated signal across the resistor 364 produce a current flow in the diode 372. This produces a negative charge across the capacitor 368. This charge serves to provide an automatic bias control for the grid of the pentode 376, and this bias is a function of the amplitude of the signal from the pre-amplifier 22. Any tendency for the amplitude of the signal from the pre-amplifier to undergo slow amplitude changes causes the self-biasing action of the capacitor 368 and its associated circuitry to vary in correspondence with such changes. This shifts the bias of the pentode 376 and maintains the amplitude of its output signal essentially constant. The desired time constant for the self-biasing action described above is provided by the discharge resistor 366.

The circuit described above constitutes, therefore, the automatic bias control 40 of Figure 1 which, in conjunction with similar controls 46 and 50, further assures that the amplitude of the individual phases of the three phase energy developed by the system will not be subject to vary due to changes in circuit parameters.

In like manner, the diode 414 rectifies the voltage from the source 408. This diode, however, is connected to provide an adjustable negative voltage across the potentiometer 422 and the resistor 420. Also, the capacitor 418 and its discharge resistor 416 provide the desired automatic bias for the control grid of the pentode 378. In the latter instance, because the voltage across the resistor 402 is developed on a positive axis, the control grid of the pentode 378 is returned to a negative voltage point at the junction of the potentiometer 422 and of the resistor 420. This provides the proper operating bias for the pentode 378.

In a manner to be described, the circuit of the pentodes 376 and 378 may be operated class B. That is, the pentode 376 may be biased to a point at which the negative half cycles of the demodulated signal from the diode 358 drive the pentode beyond its cut off point. In like manner, the pentode 378 may be biased by the described network so that the negative half cycles of the demodulated signal from the diode 396 drive the latter pentode beyond its cut off point.

As shown in the fragmentary schematic diagram of Figure 6, the common connection of the pentodes 376 and 378 of the amplifiers 52 and 54 described above is connected to the output terminal 64. This output terminal, in turn, is connected to a terminal 500 of a three-phase inductive load 502 which is assumed to have a delta connection. In like manner, a pair of pentodes 504 and 506 in the output amplifiers 56 and 58 are connected to the output terminal 66, and this output terminal is connected to a terminal 508 of the three-phase load 502. Similarly, a pair of pentodes 510 and 512 in the output amplifiers 60 and 62 are connected to the output terminal 68 which, in turn, is connected to a terminal 414 of the three-phase load 502. It is assumed that the output amplifiers 56, 58 and 60, 62 are connected like the output amplifiers 52, 54 described above.

The tubes of each of the output amplifiers are assumed as being operated in class B. Also, because of the equal amplitude and 120° phase displacement of the signal components generated by the oscillator 10, the output amplifiers function to translate a usual three-phase signal. Therefore, the signal components amplified by the tubes 504, 506 are displaced 120° from the signal components amplified by the tubes 376 and 378, and the components amplified by the tubes 510 and 512 are displaced 120° from those amplified by the tubes 504 and 506. Therefore, because each of the output amplifiers is being operated in class B, when the tube 376 is rendered fully conductive, its corresponding tube 378 is driven to cut off. At the same time, and because of the phase relation of the signals, the class B operated tubes 506 and 512 are also nonconductive, and the tubes 504 and 510 are at the one-half point of their conductivity.

Therefore, for the particular instant where the signal amplified by the tubes 376 and 378 renders the tube 376 at the peak of its conductivity, a current path is established from the positive terminal B+ through the tube 371, through the portions of the load between the terminal 500 and the terminals 508 and 514 and down through the tubes 504 and 510 to ground.

After a time interval corresponding to 120°, and when the tube 506 is at the peak of its conductivity, its corresponding class B operated tube 504 is rendered nonconductive. Due to the phase relation of the signals, both the tubes 376 and 512 are nonconductive at this particular instant, and the tubes 378 and 510 are at the halfway mark of their conductivity. For this later condition, a path is established between the terminal 508 of the load 502 and the terminals 500 and 514, the current now reversing in the portion of the load 502 between the terminals 500 and 508.

Then, at the instant displaced 120° from the instant discussed in the previous paragraph, the tube 512 rises to the peak of its conductivity and the tube 510 becomes cut off. At this last instant, the tubes 376 and 506 are rendered non-conductive and the tubes 504 and 378 are at their half-way marks of conductivity. For this last condition, therefore, a current path is established from the terminal 514 of the load 502 to the terminals 508 and 500. The current is therefore reversed in the latter two sections of the three-phase load 502. Therefore, by tracing out the full cycle flow of current in each of its sections, it will be observed that three-phase amplified energy flows in the three-phase delta-connected inductive load 502. It will also be observed that this energy is disposed on a zero direct current axis so as to exhibit the desired balanced condition. Also, because the pentodes 376, 378, 506, 504, 512 and 510 are inherently constant current devices, the system exhibits desired constant current characteristics. Such characteristics are desired when the system is used, for example, to drive or control electric motors.

The system of the invention, therefore, is capable, efficiently and with a minimum of components, of amplifying three-phase energy and of supplying the amplified three-phase energy in balanced form for use by a typical three-phase load. Moreover, the three-phase energy amplified by the system is capable in a simple and convenient manner of being controlled to an extremely low frequency without impairing the efficiency of the system.

As discussed previously herein, this variable frequency three-phase energy is eminently suited for controlling differential three-phase motors of the type disclosed in the copending Bekey application. However, the system and apparatus of the invention finds general utility in any application where balanced three-phase energy of material energy content is desired, and which is capable of exhibiting constant current characteristics and of being adjusted in frequency to a relatively low value.

Although the now preferred embodiment of the present invention has been shown and described herein, it is to be understood that the invention is not to be limited thereto, for it is susceptible to changes in form and detail within the scope of the appended claims.

I claim:

1. A system for developing balanced multi-phase alternating current output energy, said system including, means for producing a first pair of alternating current signals of mutually opposite phase, means for producing a second pair of alternating current signals of mutually opposite phase and phase displaced from corresponding ones of the signals of said first pair, a first pair of electron discharge tubes connected in series across a source of direct current exciting potential, means for introducing said first pair of alternating current signals to respective ones of the tubes of said first pair, a second pair of electron discharge tubes connected in series across said source of direct current exciting potential, means for introducing said second pair of alternating current signals to respective ones of the tubes of said second pair, and means connected to the common junction of the tubes of said first pair and to the common junction of the tubes of said second pair for receiving a utilization network for defining a current path between such common junctions.

2. A system for developing balanced three-phase alternating current output energy, said system including, means for producing a first pair of alternating current signals of mutually opposite phase, means for producing a second pair of alternating current signals of mutually opposite phase and respectively displaced by 120° from corresponding ones of the signals of said first pair, means for producing a third pair of alternating current signals of mutually opposite phase and respectively displaced by 120° from corresponding ones of the signals of said second pair, a first pair of electron discharge tubes connected in series across a source of direct current exciting potential, means for introducing said first pair of alternating current signals to respective ones of the tubes of said first pair, a first output terminal connected to the common junction of the tubes of said first pair, a second pair of electron discharge tubes connected in series across said source of direct current exciting potential, means for introducing said second pair of alternating current signals to respective ones of the tubes of said second pair, a second output terminal connected to the common junction of the tubes of said second pair, a third pair of electron discharge tubes connected in series across said source of direct current exciting potential, means for introducing said third pair of alternating current signals to respective ones of the tubes of said third pair, a third output terminal connected to the common junction of the tubes of said third pair, and means connected to said first and second and third output terminals for receiving a three-phase inductive delta-connector load.

3. The system defined in claim 2 in which each of said discharge tubes includes an anode, a cathode and a control electrode; in which said alternating current signals are introduced to the control electrodes of respective ones of said tubes; and in which the anode of one of said tubes of each of said pairs is connected to one terminal of said source and the cathode of the other tube of each of said pairs is connected to the other terminal of said source; and in which the cathode of said one tube of each of said pairs is connected to the anode of said other tube of each of said pairs, said output terminals being respectively connected to the common junction of said last mentioned cathodes and anodes.

4. A system for developing balanced three-phase alternating current output energy, said system including, a first oscillator for producing a three-phase output signal of relatively low frequency, a second oscillator for producing a carrier wave of relatively high frequency, modulator means for modulating said three-phase output signal on said carrier wave to provide three distinct output signals each corresponding to a different phase of said output signal from said first oscillator, first and second and third detector means for respective ones of said output signals from said modulator means, first and second and third phase inverter means respectively included in said first and second and third detector means, said first detector means and said first phase inverter means producing a first pair of alternating current signals of mutually opposite phase, said second detector means and said second phase inverter means producing a second pair of alternating current signals of mutually opposite phase and respectively displaced 120° from corresponding ones of the signals of said first pair, said third detector means and said third phase inverter means producing a third pair of alternating current signals of mutually opposite phase and displaced 120° from corresponding ones of the signals of said second pair, a first pair of electron discharge tubes connected in series across a source of direct current potential, means for introducing said first pair of alternating current signals to respective ones of the tubes of said first pair, a second pair of electron discharge tubes connected in series across the source of direct current potential, means for introducing said second pair of alternating current signals to respective ones of the tubes of said second pair, a third pair of electron discharge tubes connected in series across the source of direct current potential, means for introducing said third pair of alternating current signals to respective ones of the tubes of said third pair, and means connected to the common junction of the tubes of said first pair and to the common junction of the tubes of said second pair and to the common junction of the tubes of said third pair for receiving a three-phase network defining a current path between the common junctions of each of said pairs of tubes.

5. The combination defined in claim 4 in which each of said detector means includes a first detector section for producing a first signal in phase with the modulation component of the corresponding output signal from said modulator, and in which each of said detector means includes a second detector section for producing a second signal in phase opposition to the modulation component of such corresponding output signal from said modulator.

6. In a system for producing balanced multi-phase output energy, the combination of: first means for producing a first pair of alternating current signals of mutually opposite phase, a first pair of electron discharge tubes connected in series across a source of direct current exciting potential, means for introducing said first pair of alternating current signals to respective ones of the tubes of said pair, second means for producing a second pair of alternating current signals of mutually opposite phase and being phase displaced from said first pair of alternating current signals, a second pair of electron discharge tubes connected in series across the source of direct current exciting potential, means for introducing said second pair of alternating current signals to respective ones of the tubes of said second pair, and means connected to the common junction of the tubes of the first pair and to the common junction of the tubes of the second pair for receiving a utilizing network for defining a current path between such common junctions.

7. In a system for producing balanced multi-phase output energy, the combination of: first means for producing a first pair of alternating current signals of mutually opposite phase; first and second electron discharge tubes each having an anode and a cathode and a control electrode, said cathode of said first tube being connected to said anode of said second tube, said anode of said first tube being connected to one terminal of a direct current exciting potential source and said cathode of said second tube being connected to the other terminal of said source, means for introducing said first pair of alternating current signals to respective ones of the control electrodes of said first and second tubes, second means for producing a second pair of alternating current signals of mutually opposite phase and being phase-displaced 120° from said first pair of alternating current signals; third and fourth electron discharge tubes each having an anode and a cathode and a control grid, said cathode of said third tube being connected to said anode of said fourth tube, said anode of said third tube being connected to one terminal of a direct current exciting potential source and said cathode of said fourth tube being connected to the other terminal of said source, means for introducing said first pair of alternating current signals to respective ones of the control electrodes of said third and fourth tubes, third means for producing a third pair of alternating current signals of mutually opposite phase and being phase displaced 120 degrees from said second pair of signals; fifth and sixth electron discharge tubes each having an anode, a cathode and a control electrode, said cathode of said fifth tube being connected to the anode of said sixth tube, said anode of fifth tube being connected to one terminal of a direct current exciting potential source and said cathode of said sixth tube being connected to the other terminal of said source, means for introducing said third pair of alternating current signals to respective ones of the control electrodes of said fifth and sixth tubes, and means connected to the common junction of said cathode of said first tube and said anode of said second tube and to the common junction of said cathode of said third tube and said anode of said fourth tube and to the common junction of said cathode of said fifth tube and said anode of said sixth tube for receiving a three-phase utilization network for defining a current path between each of the common junctions.

8. In a system for producing balanced multi-phase output energy, the combination of: first detector means for producing a first alternating current signal, second detector means including phase inverter means for producing a second alternating current signal in phase opposition with said first alternating current signal, a first pair of electron discharge tubes connected in series across a source of direct current exciting potential, means for introducing said first alternating current signal to one of said tubes to control the discharge thereof, means for introducing said second alternating current signal to the other of said tubes to control the discharge thereof, third detector means for producing a third alternating current signal phase displaced by 120 degress from the first alternating current signal, fourth detector means including phase inverter means for producing a fourth alternating current signal in phase opposition with the third alternating current signal, a second pair of electron discharge tubes connected in series across the source of direct current exciting potential, means for introducing the third alternating current signal to one of the tubes of the second pair to control the discharge thereof, means for introducing the fourth alternating current signal to the other of the tubes of the second pair to control the discharge thereof, fifth detector means for producing a fifth alternating current signal phase-displaced by 120 degrees from the third alternating current signal, sixth detector means including phase inverter means for producing a sixth alternating current signal in phase opposition with said fifth alternating current signal, a third pair of electron discharge tubes connected in series across the source of direct current exciting potential, means for introducing the fifth alternating current signal to one of the tubes of the third pair to control the discharge thereof, means for introducing the sixth alternating current signal to the other of the tubes of the third pair to control the discharge thereof, and means connected to the common junction of the tubes of the first pair and to the common junction of the tubes of the second pair and to the common junction of the tubes of the third pair for receiving a three-phase utilizing network for defining a current path between the common junctions of each of said pair of tubes.

9. In a system for producing balanced multi-phase output energy, the combination of: modulator means for producing a plurality of modulated output signals each modulated in accordance with a different phase of a multi-phase input signal introduced thereto, first detector means responsive to one of said modulated output signals for producing a first alternating current signal in phase with the modulation component thereof, second detector means including phase inverter means responsive to said one of said modulated output signals for producing a second alternating current signal in phase opposition to the modulation component thereof, a first pair of electron discharge tubes connected in series across a source of direct current exciting potential, means for introducing said first alternating current signal to one of said tubes to control the discharge thereof, means for introducing said second alternating current signal to the other of said tubes to control the discharge thereof, third detector means responsive to a second modulated output signal from the modulator means for producing a third alternating current signal in phase with the modulation component of the second signal, fourth detector means including phase inverting means responsive to said second modulated output signal for producing a fourth alternating current signal in phase opposition to the third alternating current signal, a second pair of electron discharge tubes connected in series across the source of direct current exciting potential, means for introducing the third alternating current signal to one of said tubes of the second pair to control the discharge thereof, means for introducing said fourth alternating current signal to the other of said tubes of the second pair to control the discharge thereof, fifth detector means responsive to a third of said modulated output signals for producing a fifth alternating current signal in phase with the modulation component of such third modulated output signal, sixth detector means including phase inverter means responsive to said third modulated output signal for producing a sixth alternating current signal in phase opposition to the fifth alternating current signal, a third pair of electron discharge tubes connected in series across the source of direct current exciting potential, means for introducing said fifth alternating current signal to one of said tubes of the third pair to control the discharge thereof, means for introducing the sixth alternating current signal to the other of said tubes of the third pair to control the discharge thereof, and means connected to the common junction of the tubes of the first pair and to the common junction of the tubes of the second pair and to the common junction of the tubes of the third pair for receiving a three-phase utilization network which defines a current path between each of said common junctions.

10. In a system for producing balanced multi-phase output energy, the combination of: an oscillator for producing three output signals of like frequency and phase displaced from one another by 120°, modulator means coupled to said oscillator for producing three modulated output signals each modulated with a different one of said oscillator signals, first detector means responsive to one of said modulated output signals for producing a first alternating current signal in phase with the modulation component thereof, second detector means including phase inverter means responsive to said one of said modulated output signals for producing a second alternating current signal in phase opposition to the modulation component thereof, a first pair of electron discharge tubes connected in series across a source of direct current exciting potential, means for introducing said first alternating current signal to one of said tubes to control the discharge thereof, means for introducing said second alternating current signal to the other of said tubes to control the discharge thereof, third detector means responsive to the second of said three modulated output signals for producing a third alternating current signal in phase with the modulation component of said second modulated output signal, fourth detector means including phase inverter means responsive to said second of said modulated output signals for producing a fourth alternating current signal in phase opposition with the modulation component of the second modulated output signal, a second pair of electron discharge tubes connected in series across the source of direct current exciting potential, means for introducing said third alternating current signal to one of said tubes of the second pair to control the discharge thereof, means for introducing said fourth alternating current signal to the other of said tubes of the second pair to control the discharge thereof, fifth detector means responsive to the third of said three modulated output signals for producing a fifth alternating current signal in phase with the modulation component of the third modulated output signal, sixth detector means including phase inverter means responsive to said third of said modulated output signals for producing a sixth alternating current signal in phase opposition with the modulation component of said third modulated output signal, a third pair of electron discharge tubes connected in series across the source of direct current exciting potential, means for introducing said fifth alternating current signal to one of said tubes of the third pair to control the discharge thereof, means for introducing said sixth alternating current signal to the other of said tubes of said third pair to control the discharge thereof, and means connected to the common junction of the tubes of the first pair and to the common junction of the tubes of the second pair and to the common junction of the tubes of the third pair for receiving a three-phase utilizing network which defines a current path between each of the common junctions.

11. The combination defined in claim 10 in which said modulator means includes first and second and third diode means each having an anode and a cathode, common impedance means connecting the cathodes of said first and second and third diodes to a positive potential point, means for introducing a carrier wave across said common impedance means, and means for introducing said three output signals from said oscillator to respective ones of said anodes.

12. The system defined in claim 2 in which each of the alternating current signals renders its corresponding discharge tube non-conductive for a half of each cycle thereof.

13. The system defined in claim 10 in which each of the alternating current signals renders its corresponding discharge tube non-conductive for a half of each cycle thereof.

14. The system defined in claim 10 in which said modulator means includes first and second and third diode means each having an anode and a cathode, common impedance means connecting the cathodes of said first and second and third diodes to a positive potential point, individual impedance means connected to the respective anodes of the diodes, means for introducing a carrier wave across said common impedance means, means for introducing said three signals from said oscillator to respective ones of said individual impedance means, and means for deriving three modulated output signals from respective ones of the anodes of said diodes.

15. In a system for producing balanced multi-phase output energy, the combination of: an oscillator for producing three output signals of like frequency and amplitude, the output signals being phase displaced from one another by 120 degrees; first, second and third diodes each having an anode and a cathode; common impedance means connected to the cathodes of the first, second and third diodes and to a positive potential point; means for introducing the three output signals from the oscillator to respective ones of the anodes of said diodes; a carrier signal source; means for introducing a carrier signal from said source across said common impedance means, and means for deriving a modulated output signal from the anode of each of said diodes.

16. In a system for producing balanced multi-phase output energy, the combination of: an oscillator for producing three output signals of like frequency and amplitude, the output signals from the oscillator being phase displaced from one another by 120 degrees; first, second and thrid diodes each having an anode and a cathode; common impedance means connected to the cathodes of the first, second and third diodes and to a positive potential point; individual impedance means connected to respective ones of the anodes of the first, second and third diodes; means for introducing the three output signals from the oscillator to respective ones of said individual impedance means; a carrier signal source; means for introducing a carrier signal from said source across said common impedance means; and means for deriving a modulated output signal from the anode of each of said diodes.

17. The combination defined in claim 16 in which the carrier signal source comprises a multivibrator for producing a square wave carrier signal.

References Cited in the file of this patent

UNITED STATES PATENTS

| | | |
|---|---|---|
| 1,634,800 | Shelleng | July 5, 1927 |
| 2,342,286 | Kock | Feb. 22, 1944 |
| 2,393,331 | McWhirter et al. | Jan. 22, 1946 |
| 2,460,790 | Jarvis | Feb. 1, 1949 |
| 2,463,073 | Webb | Mar. 1, 1949 |
| 2,633,402 | Fleming | Mar. 31, 1953 |
| 2,659,775 | Coulter | Nov. 17, 1953 |
| 2,677,720 | Bedford | May 4, 1954 |
| 2,773,136 | Futterman | Dec. 4, 1956 |